Figure 1:
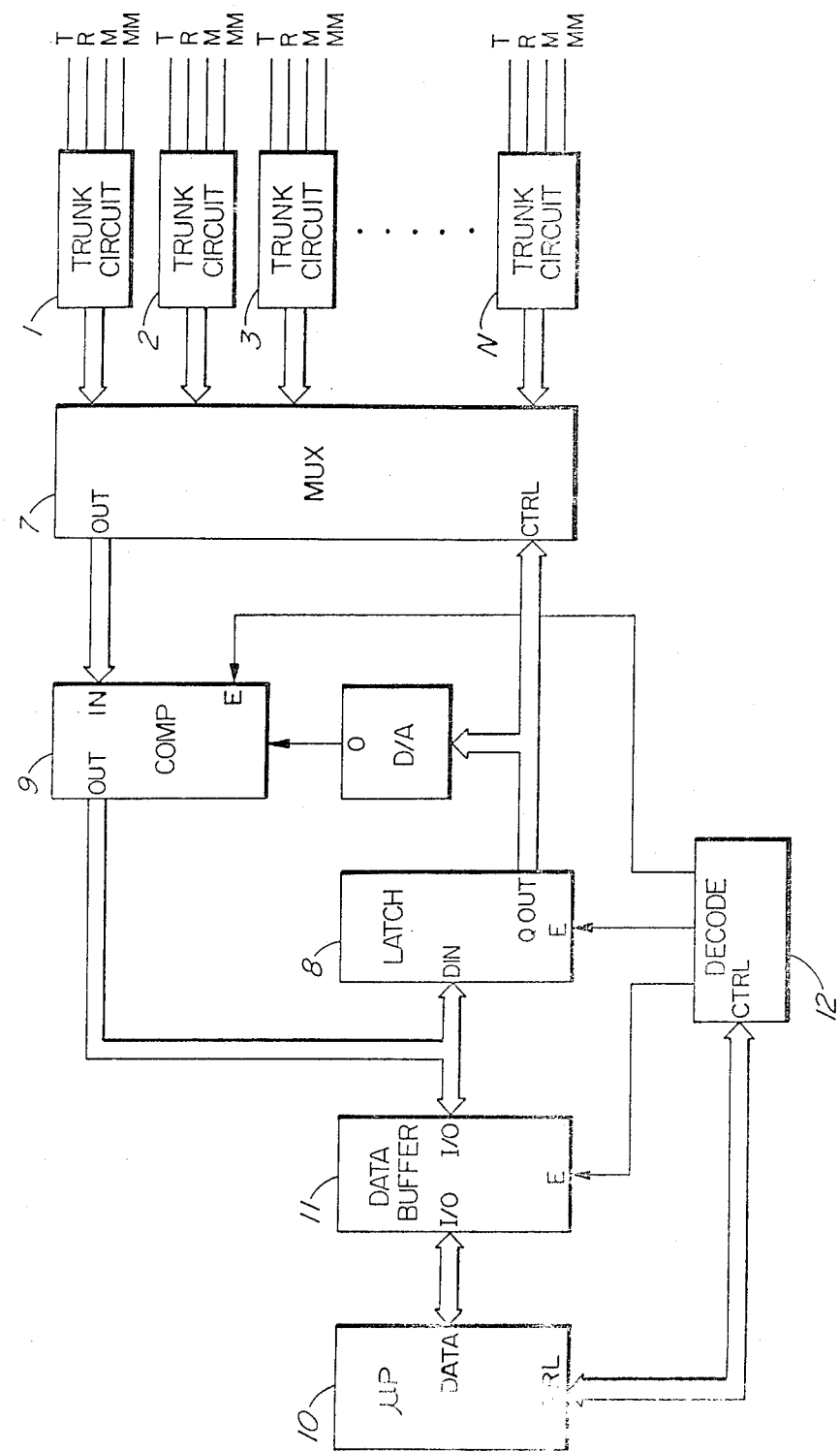

United States Patent [19]

Barsellotti et al.

[11] Patent Number: 4,734,933
[45] Date of Patent: Mar. 29, 1988

[54] TELEPHONE LINE STATUS CIRCUIT

[75] Inventors: John A. Barsellotti, Kanata; Douglas C. Oddy, Ottawa, both of Canada

[73] Assignee: Mitel Corp., Canada

[21] Appl. No.: 794,696

[22] Filed: Nov. 4, 1985

[30] Foreign Application Priority Data

Jun. 12, 1985 [CA] Canada .................................. 483829

[51] Int. Cl.[4] ............................................. H04M 3/22
[52] U.S. Cl. .................................. 379/164; 379/377; 379/382; 379/384; 379/24
[58] Field of Search ............... 379/164, 350, 377, 382, 379/383, 384, 23, 24

[56] References Cited

U.S. PATENT DOCUMENTS 4,338,495  7/1982  Bloch et al. ..................... 379/164 X Primary Examiner—James L. Dwyer
Attorney, Agent, or Firm—Antonelli, Terry & Wands

[57] ABSTRACT

A circuit for detecting a first plurality of status signals on a multiplicity of telephone lines and generating a second lesser plurality of control signals, less than the first plurality, in response thereto. Predetermined ones of the control signals are transmitted via a multiplexing circuit to a comparator circuit. A digital-to-analog converter generates analog threshold voltages for application to the comparator circuit in response to receiving command signals from a microprocessor. The comparator circuit generates a third lesser plurality of output signals, less than the second plurality, indicative of the status of a multiplicity of remote trunk circuits connected to the telephone lines. The circuit is inexpensive and occupies little circuit board area.

25 Claims, 6 Drawing Figures

TELEPHONE LINE STATUS CIRCUIT

This invention relates to telephone systems in general, and more particularly to a telephone line status circuit for detecting the status of one or more remote telephone circuits connected via one or more telephone lines to a local PABX.

Modern day PABXs are typically required to detect status (supervisory) signals generated by one or more telephone circuits, such as trunk circuits connected to one or more remote central offices and to the PABX via telephone lines. Voice and status signals are typically transmitted from remote trunk circuits along telephone lines comprised of balanced tip and ring lead pairs. Trunk circuits located at the PABX typically include line status circuits for receiving the status signals and generating one or more control signals in response thereto, for transmission to a control circuit of the PABX. The control circuit is typically comprised of a microprocessor which implements predetermined software routines such as ringing, gain control or line seize, for controlling operation of the PABX in response to receiving the control signals.

The line status circuits typically detect the presence of tip ground, ring ground, forward and reverse current status signals carried by the balanced tip and ring lead pairs. Seizure of a telephone line by one of the remote trunk circuits can be detected in response to reception of the aforementioned status signals.

Message status signals are typically generated in the form of meter pulses by a remote central office, for providing an indication to the PABX of the cost of a long distance call placed by a local subscriber on a telephone set connected to the PABX. In North America, meter pulses are usually transmitted along a balanced message lead pair at a rate of from one per 100 msec. to one per 5 minutes. Hence, a local trunk circuit preferably has four input terminals for connection to the tip and ring, and message lead pairs. However, in Europe message signals are typically carried by the tip and ring leads, in the form of amplitude modulated meter pulses.

Line status circuits generate message control signals in response to detecting the meter pulses and the PABX control circuit counts the number of pulses in order to provide an indication of the total cost of the call, which can be useful for billing guests at a hotel, or for keeping track of employees' long distance charges in a large company, etc.

Local PABX trunk circuits are typically configured for operation in one of two modes; loop start or ground start. A jumper clip on a trunk circuit card of the PABX is usually connected in one of two positions, in order to select one of the two modes. The local trunk circuit generates a loop start/ground start status signal in response to the jumper clip being connected in one of the two positions. The status circuit senses the generated loop start/ground start status signal and in response generates a control signal to the control circuit which implements predetermined microprocessor routines in accordance with the selected loop or ground start mode.

Ringing status signals typically appear on the tip and ring leads in the form of 20 Hz, 90 volt RMS AC signals. The local line status circuits sense the ringing status signals and generate further control signals in response thereto, for causing ringing in one or more of the telephone sets connected to the PABX.

Prior art line status circuits typically incorporated a multiplicity of comparators for comparing the amplitude of each received status signal to a corresponding threshold voltage and generating a control signal in response thereto for transmission to the PABX control circuit. The threshold voltage was usually generated using a voltage divider circuit, requiring a plurality of resistors. Hence, prior art line status circuits required at least as many comparators and voltage divider circuits as there were status signals to be detected. In the event the amplitude of a particular one of the status signals was greater than the corresponding threshold voltage, the corresponding comparator generated and transmitted a control signal to the PABX indicative of detection of the particular status signal.

Hence, for a typical PABX having a plurality of trunk circuits connected thereto, an unwieldy and costly bundle of wires were required to be connected between individual ones of the line status circuits and the PABX control circuit for transmitting respective ones of the control signals.

For instance, six trunk circuits may be disposed on the local trunk circuit card in the PABX. Hence, with at least seven status signals being received, (forward and reverse current, ring ground, tip ground, loop start/ground start, ringing and message), prior art line status circuits typically required at least 42 comparators per trunk circuit card. Solid state comparators are normally fabricated on integrated circuit chips having four comparators per chip. Thus, eleven integrated comparator chips were required in each prior art line status circuit, in addition to numerous voltage divider circuits. This resulted in large and expensive circuit cards.

According to the present invention, a first plurality of status signals are received from the telephone lines by respective line status circuits and a second lesser plurality of control signals are generated in response thereto.

For example, in response to receiving forward and reverse current status signals from one of the tip and ring lead pairs of the lines, the associated line status circuit generates a single differential control signal. By sensing the polarity of the differential control signal, the relative voltage polarity across the tip and ring leads can be determined, and by subsequent monitoring of a received tip ground status signal on the same line, grounding of both the ring and tip leads can be determined. Thus, the tip ground, forward current, reverse current and ring ground status signals are detected in the present invention yielding differential and tip ground control signals in response thereto.

Predetermined ones of the plurality of generated control signals are selected in an analog multiplexer, and compared to threshold voltages in a comparator circuit. The threshold voltages are generated by a microprocessor and translated through a digital-to-analog converter. Hence, the present invention eliminates the prior art requirement of a plurality of voltage divider circuits comprised of a plurality of resistors.

Control signals from successive ones of the trunk circuits are selected or polled in a cyclic manner in response to generation of a succession of command signals by the microprocessor.

As a result of generating and multiplexing the second plurality of control signals, only a small number of wires are required to be connected to the PABX from the line status circuits. Thus, the present invention overcomes the prior art disadvantage of numerous wires extending between individual line status circuits and the PABX control circuit. According to a preferred embodiment of the invention, a single eight bit data bus extends between the line status circuits and the microprocessor.

In a successful prototype of the invention comprised of six trunk circuits, the number of required comparator chips was reduced to 1 from the prior art requirement of 11. Hence, considerable savings in cost and circuit board space were achieved over prior art line status circuits.

In addition, it is frequently desirable to detect the length of a telephone line between the remote central office and the local PABX, commonly referred to as the "loop length". The PABX control circuit typically effects internal gain adjustments in response to detection of the loop length, in order to compensate for signal losses during transmission, etc. The loop length is proportional to the DC resistance measured across the tip and ring leads at the local PABX trunk circuits. According to the prior art, additional circuitry such as comparators and voltage divider circuits were required in order to measure the DC resistance and generate a difference voltage in response thereto which was subsequently compared in a further multiplicity of comparators to additional threshold voltages in order to determine the loop length.

The present invention can be used to detect loop length without the requirement of additional comparators or voltage divider circuits. The aforementioned differential control signal is compared in one of the comparators to a plurality of reference voltages generated by the digital-to-analog converter. A successive approximation technique is implemented in order to establish the proper reference voltage, and hence the loop length, as described in detail below.

In general, the invention is a circuit for connection to a PABX and one or more telephone lines carrying status signals generated by one or more telephone circuits, comprised of a control circuit for generating command signals, circuitry for receiving status signals carried by one or more telephone lines and generating control signals in response thereto, circuitry for receiving one or more first command signals generated by the control circuit and generating one or more threshold signals in response thereto, and circuitry for receiving one or more second command signals from the control circuit, and in response comparing predetermined ones of the control signals with the one or more threshold signals, and generating a plurality of output signals in response thereto, whereby the output signals provide an indication to the PABX of the status of the telephone circuits.

More particularly, the invention is a circuit for connection to a PABX and one or more plurality of telephone lines carrying status signals generated by a plurality of remote trunk circuits, comprising, a controller circuit for generating digital command signals, one or more local trunk circuits connected to the telephone lines for receiving the status signals and generating control signals in response thereto, multiplexer circuitry having signal inputs connected to the trunk circuits and control inputs connected to the controller circuitry, for successively transmitting predetermined ones of the control signals in response to receiving predetermined command signals from the controller circuitry. The invention is also comprised of circuitry for receiving further command signals from the controller circuit and for successively generating a plurality of threshold signals in response thereto, and comparator circuitry connected to the output terminals of the multiplexer circuitry and the circuitry for generating threshold signals, for successively comparing the predetermined control signals with the threshold signals and generating a sequence of output signals for transmission to the PABX in response thereto, whereby the output signals provide an indication to the PABX of the status of the remote trunk circuits.

The invention is also a method for detecting the length of a telephone line connected to a remote trunk circuit and a local PABX, comprising the steps of detecting the differential voltage across the tip and ring leads of the telephone line, and generating a differential control signal having a first amplitude parameter proportional to the differential voltage, generating a sequence of threshold signals having further predetermined amplitude parameters, and comparing the control signal to successive ones of the threshold signals and successively approximating successive ones of the predetermined amplitude parameters to be equal to the first amplitude parameter in the event the successive ones of the predetermined amplitude parameters are not equal to the first amplitude parameter, and transmitting a predetermined one of the threshold signals in the event the amplitude parameter of the predetermined threshold signal is equal to the first amplitude parameter, whereby the amplitude parameter of the predetermined threshold signal provides an indication to the PABX of the length of the telephone line.

Figure 2:
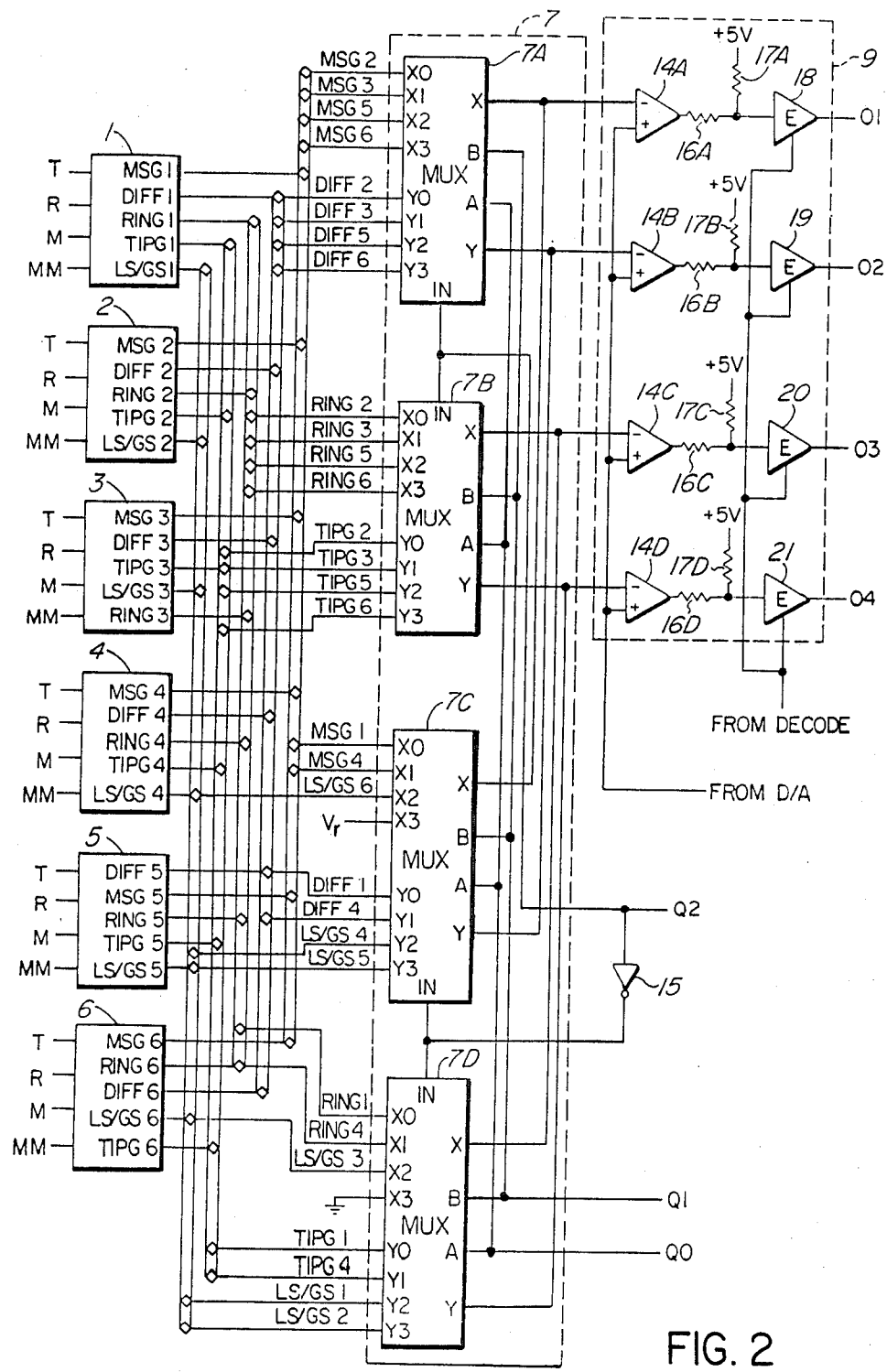
Figure 3:
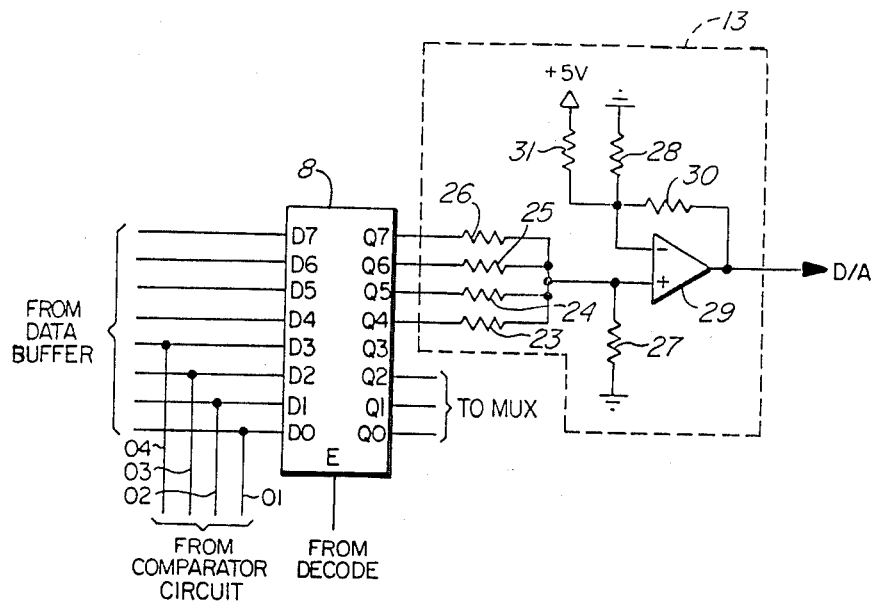
Figure 4:
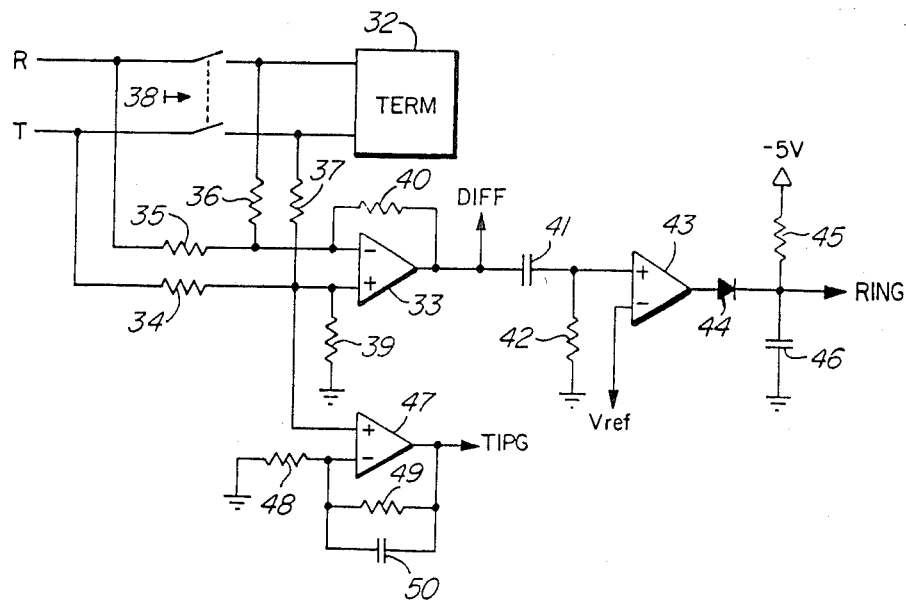
Figure 5:
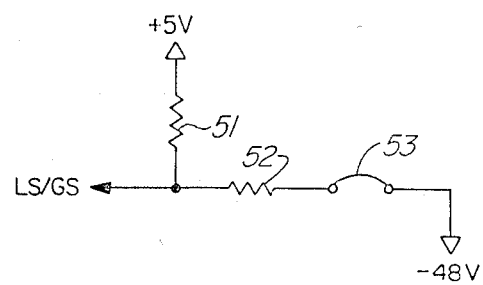
Figure 6:
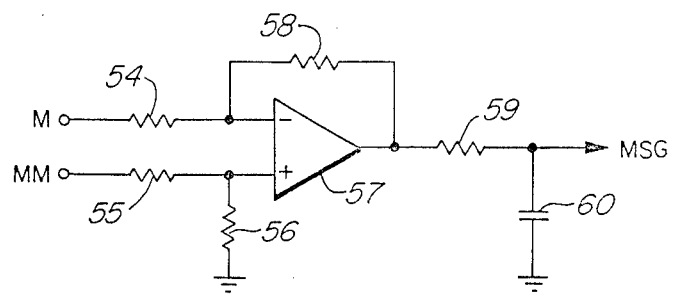

A better understanding of the invention will be obtained by reference to the detailed description below, and to the following drawings, in which:

FIG. 1 is a block schematic diagram of a line status circuit according to the present invention, FIG. 2 is a schematic diagram illustrating multiplexing and comparator circuitry according to a preferred embodiment of the invention, FIG. 3 is a schematic diagram of digital-to-analog circuit portion of the preferred embodiment, and FIGS. 4, 5 and 6 are schematic diagrams of circuits for generating tip ground, differential ringing, loop start/ground start and message control signals according to the preferred embodiment.

With reference to FIG. 1, a plurality of trunk circuits, labelled 1, 2, 3 . . . N respectively, are connected to respective telephone lines comprised of tip and ring leads T and R, and message leads M and MM for connection to one or more remote central offices. Each of the trunk circuits 1, 2, 3 . . . N incorporates trunk line status circuitry for generating control signals in response to receiving status signals from the telephone lines. Generation of the control signals is discussed in greater detail below, with respect to FIGS. 4, 5 and 6.

Each of the trunk circuits 1, 2, 3 . . . N is connected to inputs of a multiplexer 7. Multiplexer 7 has control inputs CTRL, connected to outputs Q OUT of a latch circuit 8, and a digital-to-analog converter 13. A data output OUT, of multiplexer 7 is connected to an input IN of comparator circuit 9.

Data inputs DIN of the latch circuit 8 are connected in a circuit to a microprocessor 10 via a bidirectional data buffer 11.

A decode circuit 12 has a control input CTRL thereof connected to a control output CTRL of the microprocessor 10. Signals appearing at the CTRL output of microprocessor 10 are typically in the form of read/write signals, chip select signals, etc. Decode circuit 12 generates enable signals for application to the enable input of data buffer 11, latch circuit 8 and comparator circuit 9 in response to receiving predetermined ones of the signals from microprocessor 10.

An analog output 0 of digital-to-analog converter 13 is connected to comparator circuit 9. An output OUT of comparator circuit 9 is connected to an I/O input of data buffer 11, and the parallel data input DIN of latch circuit 8.

In operation, trunk circuits 1, 2, 3 . . . N generate control signals for application to multiplexer 7 in response to receiving status signals on the tip, ring and message leads, T, R, M and MM respectively. Microprocessor 10 generates a command signal for storage in latch circuit 8 which transmits a first portion of the command signal to the control input CTRL of multiplexer 7. Multiplexer 7 selects control signals generated by a predetermined one of the trunk circuits 1, 2, 3 . . . N in response to receiving the first portion of the command signal, and applies the selected control signals to the input IN of comparator circuit 9.

Digital-to-analog converter 13 generates a reference voltage in response to receiving a second portion of the command signal from the output Q OUT of latch circuit 8. Decode circuit 12 enables comparator circuit 9 such that the selected control signals are compared therein with the reference voltage generated by digital-to-analog converter 13. Comparator circuit 9 generates a plurality of output signals which appear on parallel output OUT in response thereto. The generated output signals are loaded into bidirectional data buffer 11 under control of decode circuit 12. Microprocessor 10 then reads the output signal stored in data buffer 11 and executes the aforementioned software routines for controlling the PABX.

With reference to FIG. 2, illustrating multiplexing and comparator circuitry according to the preferred embodiment, multiplexer 7 (FIG. 1) is comprised of four multiplexers 7A, 7B, 7C and 7D, the inputs of which are connected to line status signal outputs of six trunk circuits 1 to 6.

The message control signal output MSG of trunk circuit 1, denoted as MSG 1, is connected to an X0 input of multiplexer 7C, and the differential control signal output DIFF 1 is connected to a Y0 input of multiplexer 7C. The ringing control signal output RING 1 of trunk circuit 1 is connected to an X0 input of multiplexer 7D, the tip ground control signal output TIPG 1 is connected to a Y0 input of multiplexer 7D, and the loop start/ground start control signal output LS/GS 1 of trunk circuit 1 is connected to a Y2 input of multiplexer 7D.

The MSG signal outputs of trunk circuits 2, 3, 5 and 6 are connected to the X0, X1, X2 and X3 inputs respectively, of analog multiplexer 7A. The DIFF signal outputs of trunk circuits 2, 3, 5 and 6 are connected to the Y0, Y1, Y2 and Y3 inputs respectively, of multiplexer 7A. The RING signal outputs of trunk circuits 2, 3, 5 and 6 are connected to the X0, X1, X2 and X3 inputs respectively of multiplexer 7B, and the TIPG signal outputs of trunk circuits 2, 3, 5 and 6 are connected to the Y0, Y1, Y2 and Y3 inputs respectively, of multiplexer 7B.

The MSG 4 signal output of trunk circuit 4 is connected to the X1 input of multiplexer 7C, the X2 input of which is connected to the LS/GS 6 signal output of trunk circuit 6. The X3 input of multiplexer 7C is connected to a source of reference potential $V_r$. The Y1 input of multiplexer 9 is connected to the DIFF 4 signal output of trunk circuit 4. The LS/GS signal outputs of trunk circuits 4, 5, 1 and 2 are connected to the Y2 and Y3 inputs of analog multiplexers 7C and 7D respectively. The RING 4 signal output of trunk circuit 4 is connected to the X1 input of multiplexer 7D, and the X2 input thereof is connected to the LS/GS 3 signal output of trunk circuit 3. The X3 input of multiplexer 7D is connected to ground. The TIPG 4 signal output of trunk circuit 4 is connected to the Y1 input of multiplexer 7D.

X and Y outputs of multiplexers 7A and 7C are connected to inverting inputs of comparators 14A and 14B, respectively. X and Y outputs of multiplexers 7B and 7D are connected to inverting inputs of comparators 14C and 14D, respectively. The non-inverting inputs of comparators 14A, B, C and D are connected to the output of digital-to-analog converter 13, described above with reference to FIG. 1 and in greater detail below with reference to FIG. 3.

Inputs A and B of multiplexers 7A, B, C and D are connected to Q0 and Q1 outputs of latch circuit 8 described above with reference to FIG. 1 and in greater detail below with reference to FIG. 3. Control inhibit inputs, IN, of multiplexers 7A and B are connected together and to a Q2 output of the latch circuit. Inputs IN, of multiplexers 7C and 7D are connected together and to the output of an inverter 15, the input of which is connected to latch circuit 8.

Outputs of comparators 14A, B, C and D are connected to output resistors 16A, B, C and D respectively, which in turn are connected to pull up resistors 17A, B, C and D respectively, each of which is connected to a +5 volt power supply. The nodes connecting resistors 16A, B, C and D and 17A, B, C and D are connected to tristate buffers 18, 19, 20 and 21 respectively. Enable inputs E of buffers 18, 19, 20 and 21 are connected to decode circuit 12 (FIG. 1), and the outputs of buffers 18 to 21 are connected to respective ones of data lines 01 to 04, for connection to inputs of bidirectional data buffer 11 and latch circuit 8 (FIG. 1).

With reference to FIG. 3, inputs D0-D7 of latch circuit (the latch circuit discussed above with reference to FIG. 1), are connected to corresponding inputs/outputs I10 of bidirectional data buffer 11 (FIG. 1), which is, in turn connected to the microprocessor 10. The 01, 02, 03 and 04 outputs of buffers 18, 19, 20 and 21 (FIG. 2) are connected to inputs D0, D1, D2 and D3 of latch circuit 8, (and corresponding inputs/outputs of buffer 11). Q0 and Q1 outputs of latch circuit 8 are connected to A and B inputs respectively of multiplexers 7A, B, C and D, as discussed above with reference to FIG. 2. The Q2 output of latch circuit 8 is connected to the IN inputs of multiplexers 7A and 7B and to the input of inverter 15. The Q3 output of latch circuit 8 is not connected. A control input, E of latch circuit 8 is connected to decode circuit 12.

The Q4, Q5, Q6 and Q7 outputs of latch circuit 8 are connected via resistors 23, 24, 25 and 26 to a non-inverting input of buffer amplifier 29, and to ground via resistor 27. An inverting input of amplifier 29 is connected to ground via resistor 28 and to the +5 volt power supply via resistor 31. The inverting input of amplifier 29 is also connected via feedback resistor 30, to the output thereof in a well known manner. The output of buffer amplifier 29, is connected to the non-inverting inputs of comparators 14A, B, C and D (FIG. 2). Buffer amplifier 29, in conjunction with resistors 23 to 31, comprises the digital-to-analog converter 13 discussed with reference to FIG. 1.

In operation, with reference to FIGS. 1, 2 and 3, the command signal generated by microprocessor 10 and transmitted via bidirectional data buffer 11 (FIG. 1) is clocked into latch circuit 8 and appears on the outputs Q0–Q7 thereof in response to an enable signal being generated by the decode circuit 12, and applied to the enable input E of the latch circuit. In the absence of generation of the enable signal, the previous command signal stored on the latch remains on the Q0–Q7 outputs. The three least significant bits of the generated command signal, appearing on the Q0, Q1 and Q2 outputs are applied directly to the A, B and IN inputs of multiplexers 7A and 7B, and inverted and applied to the IN inputs of multiplexers 7C and 7D via inverter 15, in order to select predetermined ones of the control signals applied to the X0–X3 and Y0–Y3 inputs thereof, for transmission to the inverting inputs of comparators 14A, B, C and D.

TABLE 1 illustrates which status signals are selected in multiplexer 7 for application to the inverting inputs of comparators 14A, B, C and D in response to various forms of the command signal appearing on the Q0–Q2 outputs of latch circuit 8.

TABLE 1

| CONTROL SIGNALS APPLIED TO COMPARATOR INPUTS | | | | | | |
|---|---|---|---|---|---|---|
| 14D | 14C | 14B | 14A | Q2 | Q1 | Q0 |
| TIPG 2 | RING 2 | DIFF 2 | MSG 2 | 0 | 0 | 0 |
| TIPG 3 | RING 3 | DIFF 3 | MSG 3 | 0 | 0 | 1 |
| TIPG 5 | RING 5 | DIFF 5 | MSG 5 | 0 | 1 | 0 |
| TIPG 6 | RING 6 | DIFF 6 | MSG 6 | 0 | 1 | 1 |
| TIPG 1 | RING 1 | DIFF 1 | MSG 1 | 1 | 0 | 0 |
| TIPG 4 | RING 4 | DIFF 4 | MSG 4 | 1 | 0 | 1 |
| LS/GS1 | LS/GS3 | LS/GS4 | LS/GS6 | 1 | 1 | 0 |
| LS/GS2 | GND | LS/GS5 | $V_r$ | 1 | 1 | 1 |

In the preferred embodiment of the invention, the microprocessor 10 scans or polls each of the trunk circuits approximately once every 10 milliseconds, in the event the trunk circuits are idle. However, in the event one or more of the trunk circuits 1 to 6 are initiating an outgoing ground start call, the trunk circuits are scanned at a rate of one scan per 5 milliseconds.

With reference to FIG. 3, the most significant four bits of the command signal appearing on outputs Q4–Q7, are applied to the non-inverting input of buffer amplifier 29 via a plurality of binary weighted resistors 23 to 26. Resistors 23 to 27 are configured as a voltage divider in order to provide a maximum voltage at the node connecting the resistors, of approximately ⅜ of the voltage on the Q4–Q7 outputs of latch circuit 8. In the preferred embodiment of the invention, resistors 23, 24, 25 and 26 were 80k, 40k, 20k and 10k ohms, respectively, and buffer amplifier 29 had a voltage gain of approximately 1.73.

The combination of buffer amplifier 29 and resistors 28, 30 and 31 comprises a level shifting circuit of the digital-to-analog converter 13 for causing the voltage at the output of amplifier 29 to be in the range of from approximately −1.83 to +1.83 volts. Hence, in the event the Q4 to Q7 outputs of latch 8 are each at logic low voltage levels, the output of buffer amplifier 29 is at −1.25 volts, and in the event the Q4 to Q7 outputs are at logic high voltage levels (i.e. each output is at +5 volts), the output of buffer amplifier 29 is at +1.25 volts.

The output of buffer amplifier 29, is connected to the non-inverting inputs of comparators 14A, B, C and D as discussed above with reference to FIG. 2, and the threshold voltage thereon is compared to the selected ones of the control signal voltages on the outputs of multiplexers 7A, B, C and D.

In the event one of the selected control signal voltages is greater than the threshold voltage from buffer amplifier 29, the output of the corresponding one of comparators 14A, B, C and D goes to a negative voltage. This negative voltage is level shifted to approximately zero volts via the associated voltage divider network comprised of the combinations of resistors 16A and 17A, 16B and 17C, etc. The approximately zero volt signal is applied to the corresponding input of one of buffers 18 to 21. Similarly, in the event the selected control signal voltage is less than the threshold voltage, the output of the corresponding comparator 14A, B, C and D goes to a high impedance open-collector state, and the voltage appearing thereon is pulled up to approximately +5 volts via the corresponding one of pull-up resistors 17A, B, C and D. The approximately +5 volt signal is applied to the corresponding one of buffers 18 to 21. The resulting output signals on the inputs of buffers 18 to 21 are transmitted to the microprocessor 10 via bidirectional data buffer 11, along data lines 01–04, in response to a further enable signal being generated by decode circuit 12 and applied to the enable inputs of buffers 18 to 21.

The circuitry discussed with reference to FIGS. 1, 2 and 3 is directed to signal multiplexing, comparing and threshold voltage generation aspects of the present invention. However, as discussed above, each of the trunk circuits 1 to 6 includes a line status circuit for generating the DIFF, RING, TIPG, MSG and LS/GS control signals. The circuitry described below, with reference to FIGS. 4, 5 and 6, is directed to operation of the line status circuits disposed in each of the trunk circuits 1 to 6.

Referring now to FIG. 4, tip and ring leads T and R are shown connected to a trunk termination circuit 32, such as a hybrid, for receiving voice signals from the telephone line. The tip and ring leads are also connected to non-inverting and inverting inputs respectively of a differential amplifier 33 via input resistors 34 and 35, and resistors 36 and 37 via ganged switch 38. Hence, the tip and ring leads, T and R, are connected to the inverting and non-inverting inputs of amplifier 33 via the parallel combinations of resistors 34 and 37, and 35 and 36 in the event switch 38 is closed. The non-inverting input of amplifier 33 is connected to ground via resistor 39, and the inverting input is connected to the output thereof via feedback resistor 40, in a well known manner.

Differential amplifier 33 generates the aforementioned differential control signal DIFF, which is proportional to the differential voltage between the tip and ring leads, and applies the DIFF control signal to the DIFF output of the trunk circuit. The DIFF signal is AC coupled via an RC network, comprised of a capacitor 41 connected to a resistor 42, to a non-inverting input of a comparator 43. An inverting input of comparator 43 is connected to a source of reference voltage, typically 100 millivolts. The output of comparator 43 is connected via diode 44 to an RC network comprised of resistor 45 connected to capacitor 46. One terminal of resistor 45 is connected to a −5 volt power supply and the other terminal thereof is connected to a node connecting the cathode of diode 44 and one terminal of capacitor 46. The other terminal of capacitor 46 is connected to ground. The node connecting resistor 45, diode 44 and capacitor 46 is connected to the RING output of the trunk circuit.

In the event of ringing signal being carried by the tip and ring leads, the differential control signal, DIFF is typically in the form of a 20 Hz AC signal having a peak-to-peak voltage of typically greater than 250 millivolts. Hence, during the positive portion of the DIFF signal cycle, capacitor 46 charges, and the capacitor discharges slowly such that the charge remains substantially thereon during the negative half cycle. Thus, the 20 hertz AC component of the DIFF signal is substantially converted to a DC signal of approximately +4 volts appearing on the RING output, indicating the presence of ringing signal. In the event the telephone is idle, the voltage on the RING output falls to approximately −4 volts.

The tip lead T, is also connected via resistor 34 to a non-inverting input of differential amplifier 47. The inverting input of amplifier 47 is connected to ground via resistor 48 and to the output thereof via the parallel combination of resistor 49 and capacitor 50. The combination of amplifier 47, resistors 48 and 49, and capacitor 50 comprises an integrator circuit for removing AC noise signals from the tip lead. The output of amplifier 47 is connected to a TIPG output of the trunk circuit, and generates the TIPG control signal in response to the tip lead being connected to ground.

TABLE 2 illustrates typical D.C. voltage levels of the DIFF, TIPG and RING control signals for various states of the telephone line (e.g. off-hook, on-hook and ringing), for both the loop start and ground start configurations, and a −48 volt central office battery voltage.

TABLE 2

|  | TRUNK STATE | DIFF | TIPG | RING |
| --- | --- | --- | --- | --- |
| LOOP START | On-hook | +0.95 V | 0.0 V | −4 V |
|  | Ringing | undefined | 0.0 V | +4 V |
|  | Seize line | +0.5 V | undefined | −4 V |
| GROUND START | On-hook | 0.0 V | −0.75 V | −4 V |
|  | Tip ground | +0.85 V | −0.1 V | −4 V |
|  | Ringing | undefined | −0.1 V | +4 V |
|  | Seize line | +0.5 V | undefined | −4 V |

Hence, according to the present invention, only three differential amplifiers, 33, 43 and 47, are required in order to detect the on-hook, off-hook and ringing status of the telephone line, whereas prior art circuits required at least five comparators for detecting forward current, reverse current, tip ground, ring ground and ringing signals.

In order to determine the loop length, the differential voltage between the tip and ring leads is first measured with switch 38 in the open position and while the local trunk circuit is in the on-hook state in order to determine the central office battery voltage. Hence, a differential voltage of approximately −24 or −48 volts appears across the tip and ring leads, depending on the central office battery voltage. In the event the central office battery voltage is −24 volts, the DIFF signal has an amplitude of less than approximately 0.58 volts, and in the event the battery is −48 volts, DIFF control signal has an amplitude in the range of from approximately 0.58 to 1.08 volts.

The differential voltage between the tip and ring leads is measured according to a successive approximation technique. The DIFF control signal is applied to the inverting input of comparator 14B via one of multiplexers 7A or 7C, as described above. A sequence of threshold voltages generated by digital-to-analog converter 13, are applied to the non-inverting input of comparator 14B, which generates a logic high signal in the event the threshold voltage is greater than the amplitude of the DIFF signal or a logic low voltage in the event it is less than the DIFF signal. The logic high or low voltage is applied to data line 02 via buffer 19. Microprocessor 10 (FIG. 1) reads the logic high or low signal via data buffer 11 and generates a command signal in response thereto for causing generation of a further threshold voltage, approximating the DIFF signal voltage.

This successive approximation procedure is repeated until the amplitude of the threshold voltage is approximately equal to the amplitude of the DIFF signal, giving the microprocessor 10 an indication of the central office battery.

In the event the local trunk circuit seizes the telephone line, switch 38 is closed and the off-hook tip to ring lead voltage is detected in order to determine the loop length, with respect to the previously detected central office battery voltage. The off-hook DIFF signal amplitude is approximately 1/11 of the voltage across the tip and ring leads. Thus, for a −24 volt battery and DIFF signal voltage of greater than approximately 1.58 volts, the loop length is less than 2 kilometers. For a battery voltage of −48 volts and a DIFF signal amplitude of greater than approximately 0.92 volts, the loop length is less than 2 kilometers. The loop length is typically determined once per call and utilized for controlling signal gain etc.

The digital-to-analog converter 13 described with reference to FIG. 3, has four bit resolution. The off-hook tip to ring lead voltage is typically considerably less than the on-hook battery voltage. In order to detect the lower off-hook voltage, the gain of differential amplifier 33 is increased from its on-hook gain. The gain of amplifier 33 is increased by closing switch 38 under control of the microprocessor 10, such that resistors 35 and 36 are connected in parallel to the tip terminal and the inverting input of differential amplifier 33, and resistors 34 and 37 are connected in parallel to the ring terminal and the non-inverting input of differential amplifier 33. Hence, the effective input resistances connected between the tip and ring leads and respective inputs of differential amplifier 33 are lowered to approximately 2.5 M ohms from 10 M ohms, thereby increasing the gain and resolution of amplifier 33 for detecting the low off-hook tip to ring lead voltage.

With reference to FIG. 5, the +5 volt power supply is connected via resistor 51 to the LS/GS output of the trunk circuit and to a resistor 52 having a terminal thereof connected to a source of −48 volt potential via a jumper clip 53. In order to configure the trunk circuit for ground start operation, jumper clip 53 is disconnected. The LS/GS signal is a simple DC voltage of either +5 volts (in the event clip 53 is disconnected) or approximately −4 volts (in the event jumper clip 53 is connected). The ratio of resistance of resistors 51 and 52 is chosen such that the LS/GS signal is in the range of from approximately −4 volts to +5 volts.

With reference to FIG. 6, M and MM leads extending from the central office are connected via input resistors 54 and 55 respectively to inverting and non-inverting inputs of a differential amplifier 57. The non-inverting input of amplifier 57 is connected to ground via resistor 56, and the inverting input thereof is connected via feedback resistor 58 to the output in a well known manner. The output of amplifier 57 is connected via a low pass filter circuit comprised of resistor 59 and capacitor 60, to the MSG output of the trunk circuit.

Meter pulse signals are typically differentially applied to the M and MM leads by the remote central office. During a positive portion of the signal the voltage on the MM lead is greater than that on the M lead. Consequently, the output of amplifier 57 goes to a high level, charging capacitor 60. In the absence of meter pulse signals, the MSG signal is more positive than aproximately −0.42 volts, and in the event of detection of a meter pulse, the MSG signal goes more negative than approximately −0.42 volts.

In Europe, well known meter pulse detection circuitry is typically connected to the tip and ring leads, for detection of the standard 16 kHz amplitude modulated meter pulse signals thereon.

In summary, the present invention is a circuit for detecting status signals carried by one or more telephone trunk lines, generating control signals in response thereto and multiplexing the control signals for application to a comparator circuit. The present trunk line status circuit is significantly less expensive and requires fewer components than prior art trunk line status circuits.

It will be understood that variations or other embodiments may now be conceived by a person skilled in the art understanding this invention.

For instance, the present invention is not limited to detecting status signals on telephone lines connected to remote trunk circuits but alternatively can be used to detect local line circuit status signals such as off-hook, EGB (Euro-ground button) and loop length status signals, on telephone lines connected to a plurality of on-premise telephone sets, provided suitable well known technical modifications are made. The circuit of the present invention can multiplex the received status signals for application to a comparator circuit as described above.

The off-hook status signal provides an indication of one of the on-premise telephone sets going off-hook and seizing the telephone line. The EGB signal is generated in response to a push-button switch disposed on the set being momentarily depressed, and is analogous to a hookswitch flash signal used in North American telephone systems. The EGB status signal is typically of relatively short duration and indicates a special feature request by the local subscriber for implementation of a PABX special feature, such as call transfer, intercom, or number redial, etc.

As a further alternative, multiplexers 7A, B, C an D can have more than 8 inputs, or indeed, further multiplexers can be employed in order to monitor additional telephone lines, suitable modifications being made to the latch circuit 8 and bidirectional data buffer 11.

All such variations and other embodiments of the invention are considered to be within the sphere and scope of the present invention as defined in the claims appended hereto.

We claim:

1. A line status circuit for connection to a PABX and one or more telephone lines carrying a first plurality of status signals indicative of the status of one or more remote telephone circuits, comprised of:
   (a) a control circuit for generating command signals,
   (b) means for receiving said status signals carried by said one or more telephone lines, and generating control signals in response thereto,
   (c) means for receiving one or more first command signals from the control circuit and generating one or more threshold signals in response thereto, and
   (d) means for receiving one or more second command signals from said control circuit, and in response comparing predetermined ones of said control signals with said one or more threshold signals, and generating a plurality of output signals less than said first plurality of status signals, whereby said output signals provide an indication to said PABX of the status of said remote telephone circuits.

2. A line status circuit for connection to a PABX and one or more telephone lines carrying a first plurality of status signals indicative of the status of one or more remote telephone circuits, comprised of:
   (a) a control circuit for generating one or more command signals,
   (b) means for receiving said first plurality of status signals carried by said telephone lines, and generating a second plurality of control signals, less than said first plurality in response thereto,
   (c) means for generating a sequence of threshold signals in response to receiving a sequence of first command signals from said control circuit, and
   (d) means for receiving a sequence of second command signals from said control circuit, and in response comparing successive ones of said control signals with successive ones of said threshold signals, and generating a sequence of output signals, whereby said output signals provide an indication to said PABX of the status of said remote telephone circuits.

3. A circuit as defined in claim 2 wherein said control circuit is a microprocessor for generating digital command signals.

4. A circuit as defined in claim 1 wherein said means for generating one or more threshold signals is a digital-to-analog converter.

5. A circuit as defined in claim 1 wherein said means for comparing is comprised of:
   (a) one or more multiplexers connected to said means for generating control signals, and
   (b) one or more comparators having respective inputs connected to respective outputs of said multiplexers and said means for generating threshold signals, both said multiplexers and comparators having control inputs thereof connected to said control circuit, for receiving said second command signals.

6. A line status circuit for connection to a PABX and a plurality of telephone lines carrying status signals generated by a plurality of remote trunk circuits, comprising:
   (a) controller means for generating digital command signals,
   (b) one or more local trunk circuits connected to said telephone lines for receiving status signals carried by said telephone lines and generating control signals in response thereto, (c) multiplexer means having signal inputs thereof connected to said local trunk circuits and control inputs thereof connected to said controller means, for transmitting a predetermined sequence of said control signals in response to receiving a predetermined sequence of command signals from said controller means, (d) means for receiving a further sequence of command signals from said controller means, and generating a sequence of threshold signals in response thereto, and (e) comparator means connected to said multiplexer means and said means for generating threshold signals, for comparing successive ones of said transmitted control signals with successive ones of said of threshold signals and generating a sequence of output signals for transmission to said PABX in response thereto, whereby said sequence of output signals provides an indication to said PABX of the status of successive ones of said remote trunk circuits.

7. A circuit as defined in claim 6, wherein said one or more local trunk circuits are each comprised of:

(a) tip and ring terminals for connection to tip and ring leads of said telephone lines, (b) message input terminals for connection to message leads of said telephone lines, (c) means for detecting differential voltages between said tip and ring terminals and generating differential control signals in response thereto, (d) means for detecting ground voltage on said tip terminal and generating a tip ground control signal in response thereto, (e) means for detecting ringing status signals on said tip and ring terminals and generating ringing control signals in response thereto, (f) means for detecting meter pulse status signals on said message terminals and generating message control signals in response thereto, and (g) means for detecting operation of said trunk circuits in loop or ground start modes and generating loop start/ground start control signals in response thereto.

8. A circuit as defined in claim 7 wherein said means for detecting differential voltages is comprised of a first differential amplifier having inputs connected in respective circuits to said tip and ring terminals via a pair of first input resistors, and an output connected to said multiplexer means.

9. A circuit as defined in claim 8 further including relay means for coupling a further pair of input resistors in parallel with said first pair of resistors under control of said controller means, whereby the gain of said first differential amplifier is varied in order to detect large on-hook differential voltages as well as smaller off-hook differential voltages.

10. A circuit as defined in claim 8 wherein said means for detecting voltages on said tip terminal is comprised of a second differential amplifier having a first input connected in a circuit path to said tip terminal, a second input connected in an AC filtering feedback path to an output thereof, said output being connected to said multiplexer means.

11. A circuit as defined in claim 10 wherein said means for detecting ringing status signals is comprised of a third differential amplifier having a first input AC coupled to the output of said first differential amplifier, a second input connected to a further source of reference voltage and an output connected via a signal storage to said multiplexer means.

12. A circuit as defined in claim 11 wherein said means for detecting meter pulse status signals is comprised of a fourth differential amplifier having inputs thereof connected in a circuit to said message terminals and an output connected in a circuit to said multiplexer means.

13. A circuit as defined in claim 10 wherein said means for configuring said trunk circuits is comprised of a jumper clip having a first terminal connected to said multiplexer means and in a circuit to a source of positive potential, and a second terminal for connection to one of a source of negative battery potential or open circuit.

14. A circuit as defined in claim 10 wherein said controller means is a microprocessor.

15. A circuit as defined in claim 1 wherein said means for generating threshold signals is a digital-to-analog converter.

16. A circuit as defined in claim 2 wherein said means for generating one or more threshold signals is a digital-to-analog converter.

17. A circuit as defined in claim 3 wherein said means for generating one or more threshold signals is a digital-to-analog converter.

18. A circuit as defined in claim 2 wherein said means for comparing is comprised of:

(a) one or more multiplexers connected to said means for generating control signals, and (b) one or more comparators having respective inputs connected to respective outputs of said multiplexers and said means for generating threshold signals, both said multiplexers and comparators having control inputs thereof connected to said control circuit, for receiving said second command signals.

19. A circuit as defined in claim 3 wherein said means for comparing is comprised of:

(a) one or more multiplexers connected to said means for generating control signals, and (b) one or more comparators having respective inputs connected to respective outputs of said multiplexers and said means for generating threshold signals, both said multiplexers and comparators having control inputs thereof connected to said control circuit, for receiving said second command signals.

20. A circuit as defined in claim 11 wherein said means for configuring said trunk circuits is comprised of a jumper clip having a first terminal connected to said multiplexer means and in a circuit to a source of positive potential, and a second terminal for connection to one of a source of negative battery potential or open circuit.

21. A circuit as defined in claim 12 wherein said means for configuring said trunk circuits is comprised of a jumper clip having a first terminal connected to said multiplexer means and in a circuit to a source of positive potential, and a second terminal for connection to one of a source of negative battery potential or open circuit.

22. A circuit as defined in claim 11 wherein said controller means is a microprocessor.

23. A circuit as defined in claim 12 wherein said controller means is a microprocessor.

24. A circuit as defined in claim 6 wherein said means for generating threshold signals is a digital-to-analog converter.

25. A circuit as defined in claim 7 wherein said means for generating threshold signals is a digital-to-analog converter.

* * * * *